(12) United States Patent
Moore et al.

(10) Patent No.: US 12,360,931 B1
(45) Date of Patent: Jul. 15, 2025

(54) SYSTEMS, APPARATUSES, AND METHODS FOR PROCESSING SENSOR RETURN DATA

(71) Applicant: CAES Systems LLC, Arlington, VA (US)

(72) Inventors: Kenneth Moore, Colorado Springs, CO (US); Bradford Taylor, Colorado Springs, CO (US)

(73) Assignee: CAES SYSTEMS LLC, Arlington, VA (US)

( * ) Notice: Subject to any disclaimer, the term of this patent is extended or adjusted under 35 U.S.C. 154(b) by 63 days.

(21) Appl. No.: 18/136,582

(22) Filed: Apr. 19, 2023

(51) Int. Cl.
*G06F 13/30* (2006.01)
*G01S 7/295* (2006.01)
*G01S 13/933* (2020.01)

(52) U.S. Cl.
CPC ............. *G06F 13/30* (2013.01); *G01S 7/295* (2013.01); *G01S 13/933* (2020.01)

(58) Field of Classification Search
CPC ......... G06F 13/30; G01S 7/295; G01S 13/933
USPC ........... 710/15, 20, 22, 52, 54, 56, 112, 308
See application file for complete search history.

(56) References Cited

U.S. PATENT DOCUMENTS

| | | | | |
|---|---|---|---|---|
| 6,894,640 | B1* | 5/2005 | Hager | G01S 13/524 342/120 |
| 6,898,235 | B1* | 5/2005 | Carlin | H04B 1/001 342/147 |
| 10,247,815 | B1* | 4/2019 | Koubiadis | G01S 7/2813 |
| 11,808,881 | B2* | 11/2023 | Arkind | G01S 13/536 |
| 12,091,053 | B2* | 9/2024 | Owechko | H04W 4/40 |
| 2009/0219198 | A1* | 9/2009 | Zhang | G01S 19/05 342/357.68 |
| 2016/0054439 | A1* | 2/2016 | Brookner | G01S 13/91 342/36 |
| 2016/0161466 | A1* | 6/2016 | Kuan Germano | G01R 33/1269 702/19 |
| 2018/0204313 | A1* | 7/2018 | Mahmood | G06F 17/142 |
| 2021/0063559 | A1* | 3/2021 | Tzadok | G01S 13/886 |
| 2021/0263144 | A1* | 8/2021 | Gillilan | G06T 11/60 |

OTHER PUBLICATIONS

V. M. Milovanović and D. M. Tasovac, "A Customizable DDR3 SDRAM Controller Tailored for FPGA-Based Data Buffering Inside Real-Time Range-Doppler Radar Signal Processing Back Ends," IEEE EUROCON 2019—18th International Conference on Smart Technologies, Novi Sad, Serbia, 2019, pp. 1-6, doi: 10.1109. (Year: 2019).*

* cited by examiner

*Primary Examiner* — Idriss N Alrobaye
*Assistant Examiner* — Henry W Yu
(74) *Attorney, Agent, or Firm* — ALSTON & BIRD LLP

(57) ABSTRACT

Systems, apparatuses, and methods for processing sensor data are provided. For example, a sensor of an antenna array may generate return data to be processed. The return data may be processed using one or more channels, which may each be comprised of a DDR, a FIFO, and a FFT. The processed return data may generate frequency data that may locate and track a target. In various embodiments, an FPGA may be comprised of the FIFO and the FFT for each of the channels while the DDR of each channel may not be in the FPGA.

20 Claims, 8 Drawing Sheets

SYSTEMS, APPARATUSES, AND METHODS FOR PROCESSING SENSOR RETURN DATA

TECHNOLOGICAL FIELD

Example embodiments of the present invention relate generally to processing sensor return data, such as radar or sonar returns, and more particularly to systems, apparatus, and methods for processing sensor returns utilizing multiple memories and fast Fourier transforms.

BACKGROUND

Sensors, such as radar and sonar antenna arrays, transmit pulses that are returned by targets. The returns are processed to determine information about a target, such as presence, range, and velocity of the target. The processing of these returns may be limited in conventional systems by conventional system architecture and the speed of the memory associated with processing such returns.

In conventional systems return pulses may be converted into return data for processing. Conventional systems processing return data may write return data from a sensor in a memory and also read out sample data from the memory that is provided to an FFT. The writing of return data and reading of sample data may be a slower operation compared to the speed of which a FFT may process the sample data, which may include generating frequency data. The slower speed of the memory may cause the processing of returns, once started, to operate inefficiently as the FFT may wait for the sample data to be provided. Thus the FFT of the conventional system's architecture may be being utilized a small portion of the time while waiting on memory to write or store return data and read out memory cells to generate sample data. This may be particularly exacerbated when reading out of the memory requires random access of the memory and also while the memory writes or stores return data being received from a sensor to memory cells of the memory. Moreover, the system may include a sensor that provides multiple channels of data to be processed, which may further slow the speed of processing return data, particularly when a FFT is underutilized for generating frequency data.

New systems, apparatuses, and methods in processing sensor returns are needed. The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to systems, apparatuses, and methods for processing sensor returns.

In an example embodiment, a system is provided comprising: a first channel of one or more channels, wherein the first channel comprises a first DDR memory, a first FIFO, and a first FFT; an FPGA comprising at least the first FIFO and the first FFT; wherein the first DDR memory is configured to receive a burst of return data from at least one sensor, to store the burst of return data in a plurality of first DDR memory cells, to read out sample data from the plurality of first DDR memory cells, and to transmit the sample data to the first FIFO; wherein the first FIFO is configured to receive the sample data from the first DDR, to store the sample data in a plurality of first FIFO memory cells, to read out sample data stored in the plurality of first FIFO memory cells in the order the sample data was stored, and to transmit the read out sample data from to the first FFT; and wherein the first FFT of the first channel if configured to generate frequency data based on the sample data transmitted from the first FIFO.

In some exemplary implementations of the system, the first DDR memory is further configured to store the burst of return data in the DDR in a plurality of rows and to read out sample data from columns of the plurality of first DDR memory cells.

In some exemplary implementations of the system, the system is comprised of at least three channels, and wherein the first channel is associated with return data representing azimuth data, a second channel is associated with return data representing elevation data, and a third channel is associated with return data representing sum data.

In some exemplary implementations of the system, the system is comprised of at least four channels.

In some exemplary implementations of the system, the system is configured to locate a target based at least on the frequency data. In some exemplary implementations of the system, the system is further configured to determine a range and a velocity of the target based on the frequency data.

In some exemplary implementations of the system, the sensor is an antenna array. In some exemplary implementations of the system, the antenna array is comprised of a plurality of phased antennas. In some exemplary implementations of the system, the system further comprises a sensor controller to generate a plurality of signals, wherein each of the plurality of signals is associated with at least one of the plurality of phased antennas. In some exemplary implementations of the system, the antenna array is configured to transmit radar pulses and receive radar returns.

In an example embodiment, a method comprises: providing a first channel of one or more channels, wherein the first channel comprises a first DDR memory, a first FIFO, and a first FFT, and wherein the first FIFO and the first FFT are on an FPGA; receiving, at the first DDR, a burst of return data from at least one sensor; storing, at the first DDR, the burst of return data in a plurality of first DDR memory cells; reading out, at the first DDR, sample data from the plurality of first DDR memory cells; transmitting the sample data from the first DDR to the first FIFO; receiving, at the first FIFO, the sample data from the first DDR; storing, at the first FIFO, the sample data in a plurality of first FIFO memory cells; reading out, at the FIFO, the sample data stored in the plurality of first FIFO memory cells in the order the sample data was stored; transmitting the read out sample data from the first FIFO to the first FFT; and generating, by the first FFT of the first channel, frequency data based on the sample data transmitted from the first FIFO.

In some exemplary embodiments of the method, wherein storing, at the first DDR, the burst of return data in the DDR memory cells comprises storing the burst of return data in a plurality of rows, and wherein reading out, at the first DDR, sample data from the plurality of first DDR memory cells comprises reading out sample data from columns of the plurality of first DDR memory cells.

In some exemplary embodiments of the method, the one or more channels include at least three channels; and the first channel is associated with return data representing azimuth data, a second channel is associated with return data representing elevation data, and a third channel is associated with return data representing sum data.

In some exemplary embodiments of the method, the one or more channels includes at least four channels.

In some exemplary embodiments of the method, the method further comprises locating a target based at least on the frequency data.

In some exemplary embodiments of the method, the method further comprises determining a range and a velocity of the target based on the frequency data.

In some exemplary embodiments of the method, the sensor is an antenna array. In some exemplary embodiments of the method, the antenna array is comprised of a plurality of phased antennas.

In some exemplary embodiments of the method, the method further comprises: providing a sensor controller; generating, by the sensor controller, a plurality of signals, wherein each of the plurality of signals is associated with at least one of the plurality of phased antennas.

In some exemplary embodiments of the method, the method further comprises: transmitting, with the antenna array, a plurality of radar pulses; and receiving, with the antenna array, a plurality of radar returns.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
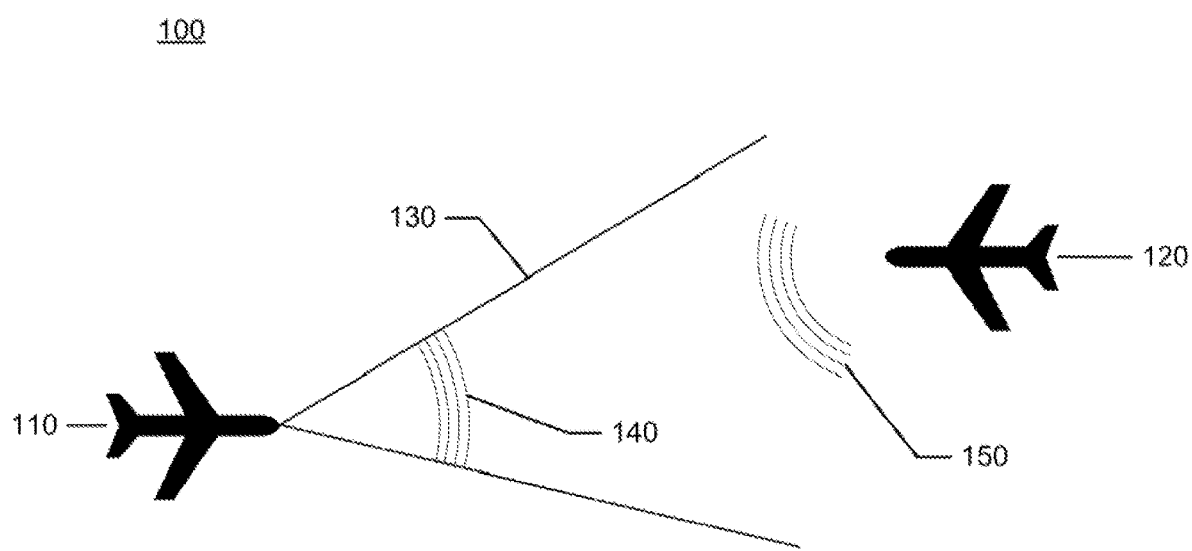
Figure 2:
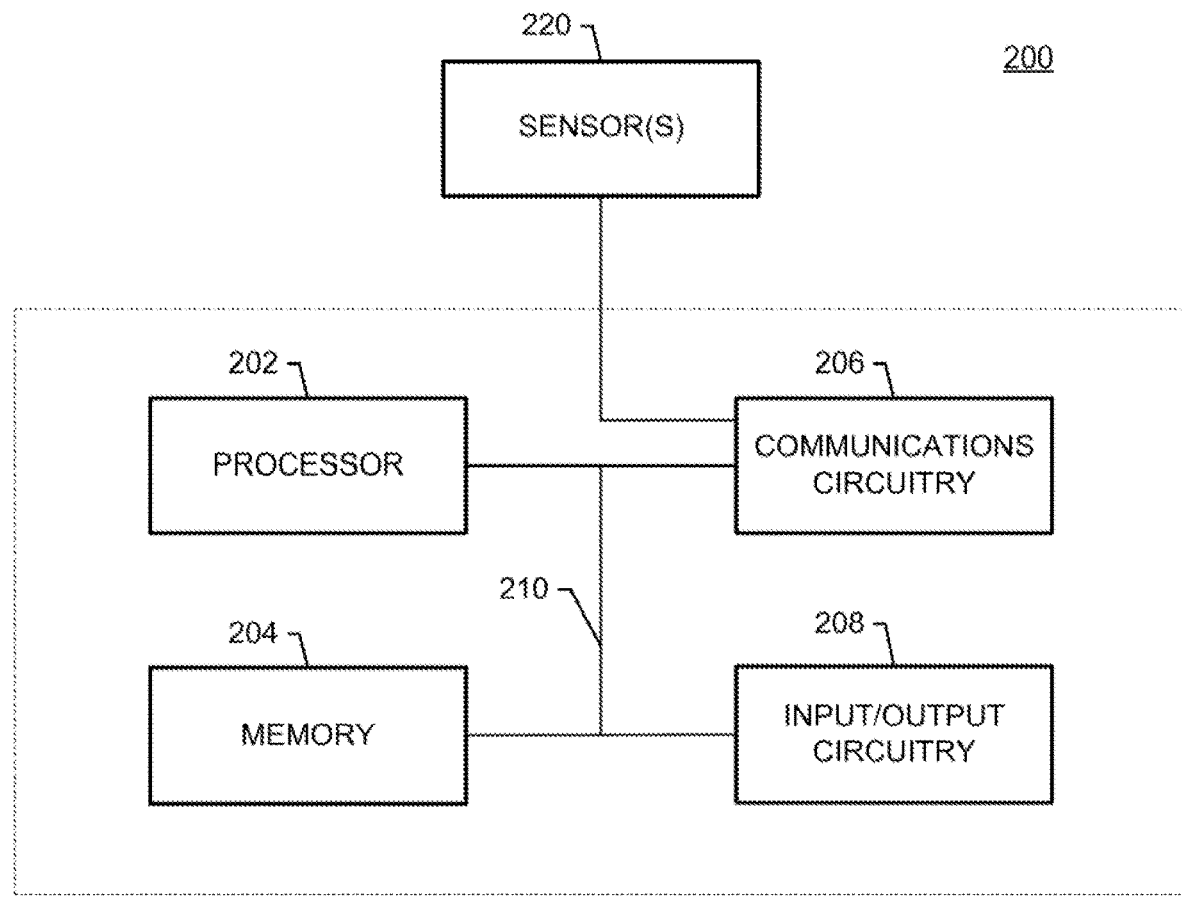
Figure 3:
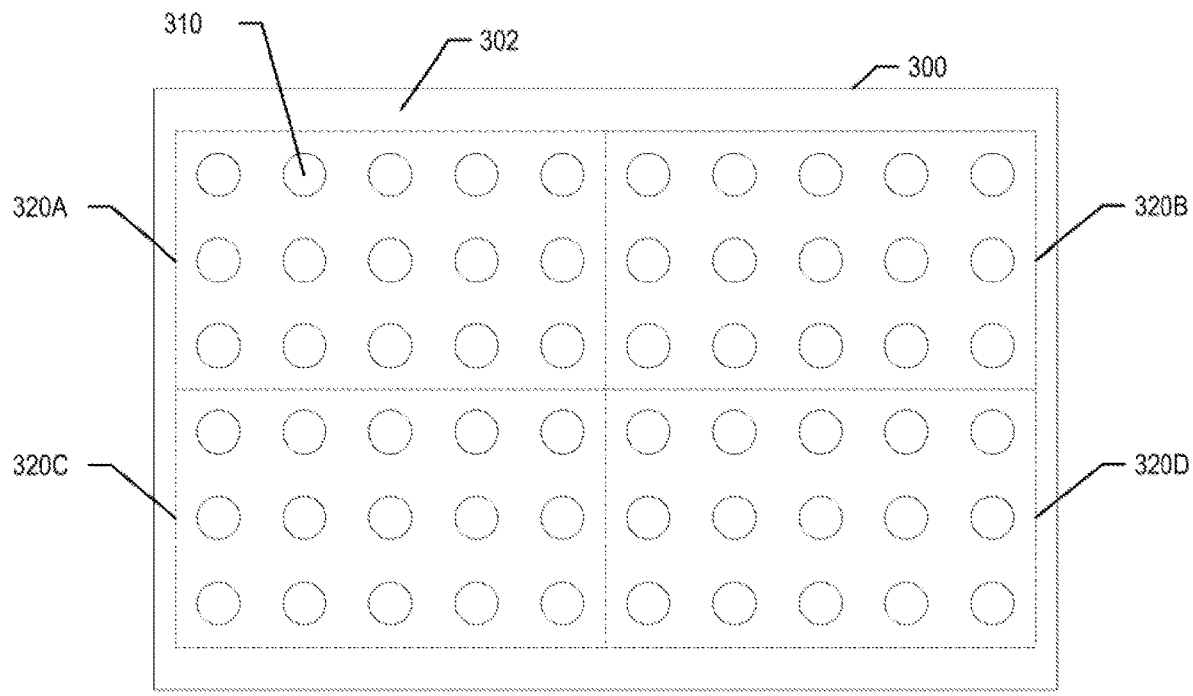
Figure 4A:
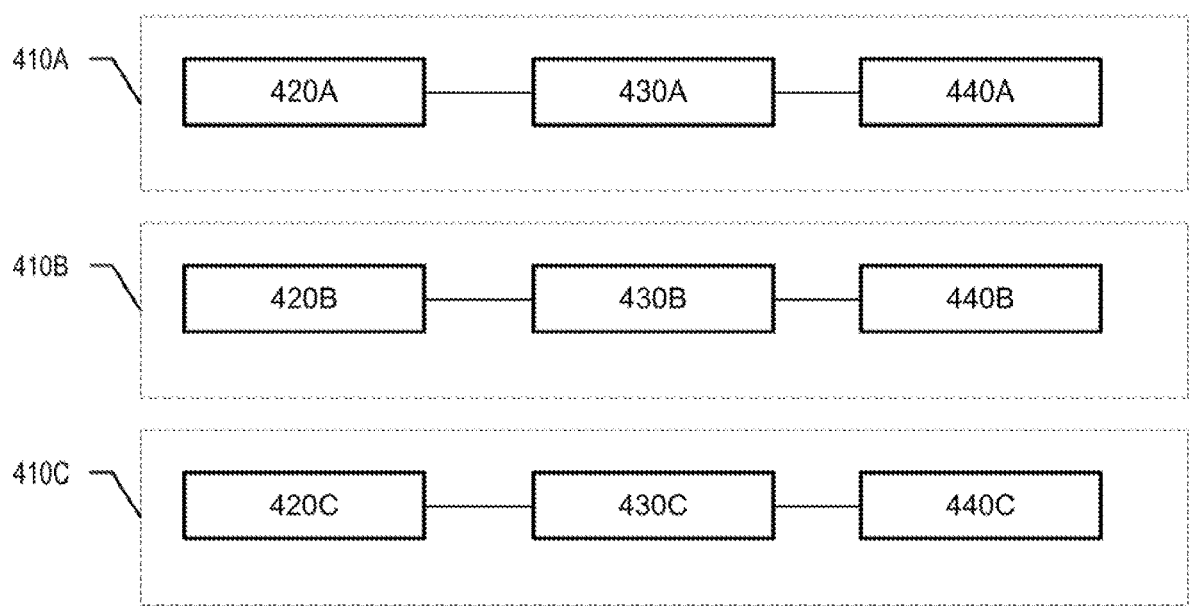
Figure 4B:
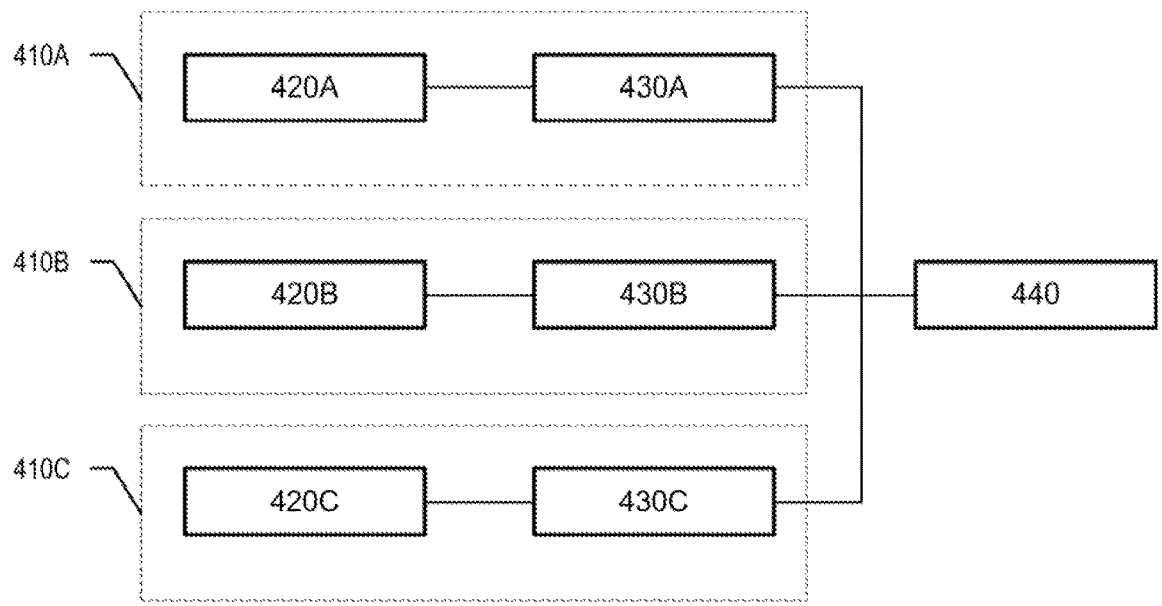
Figure 5:
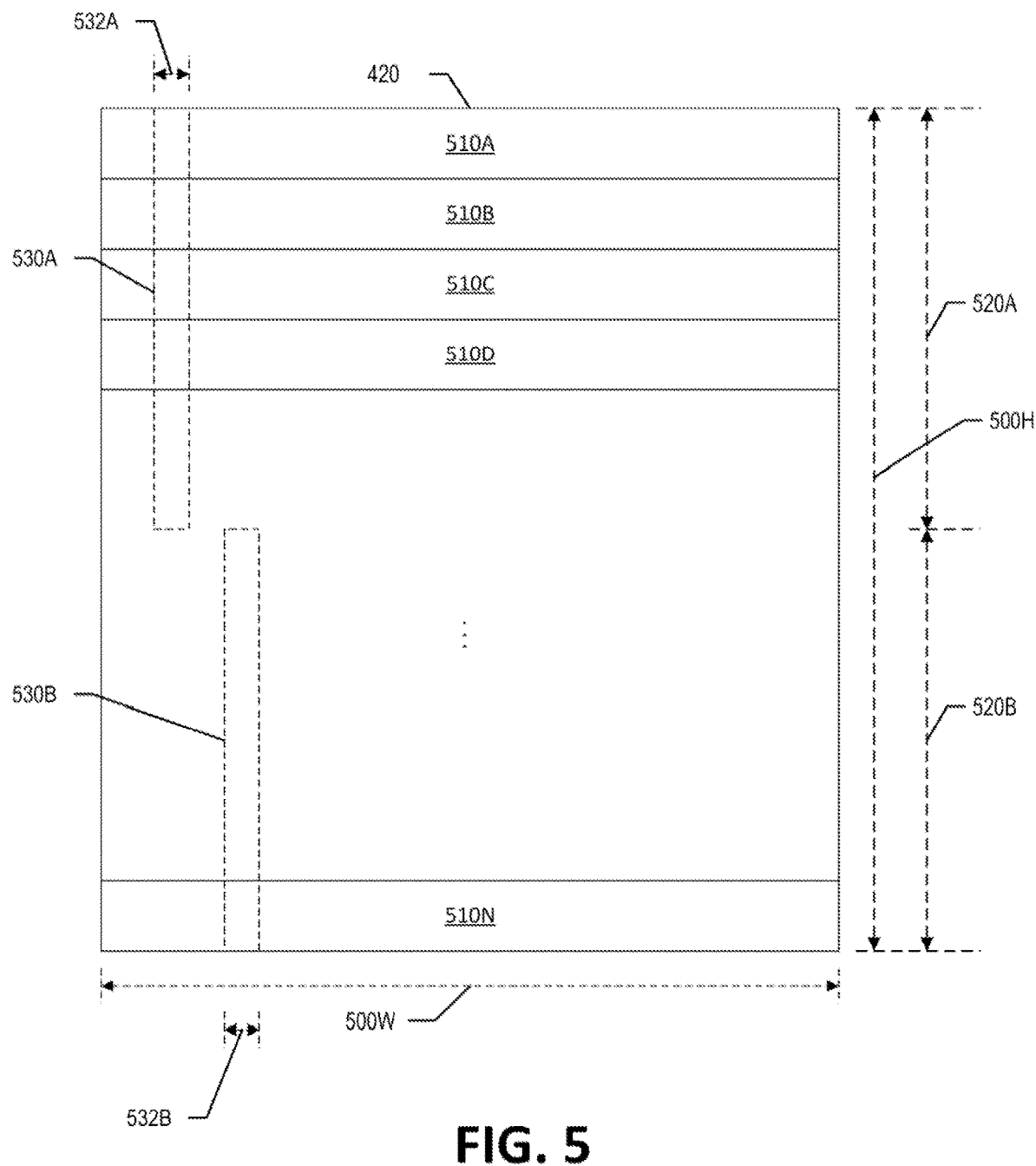
Figure 6:
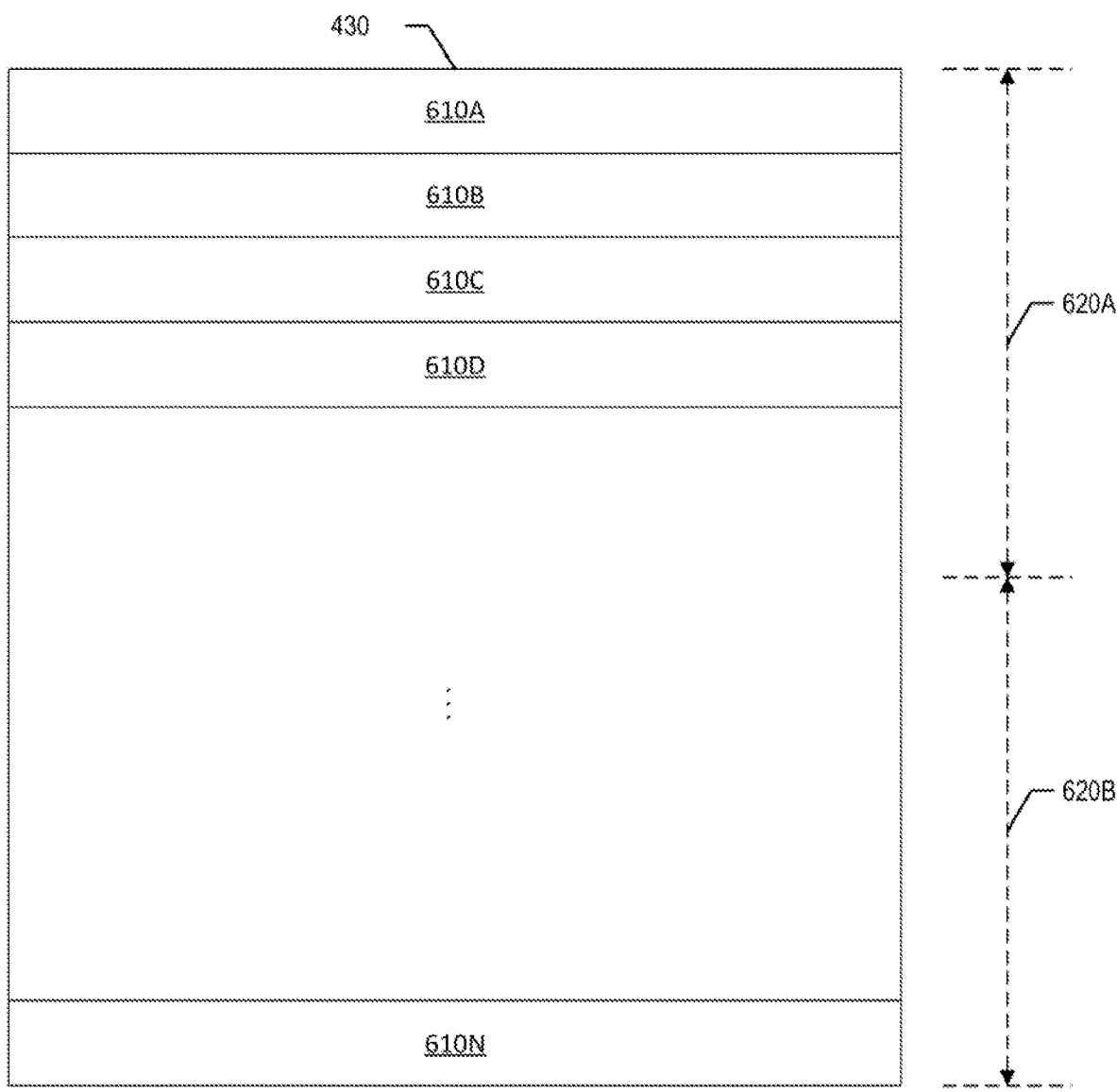
Figure 7:
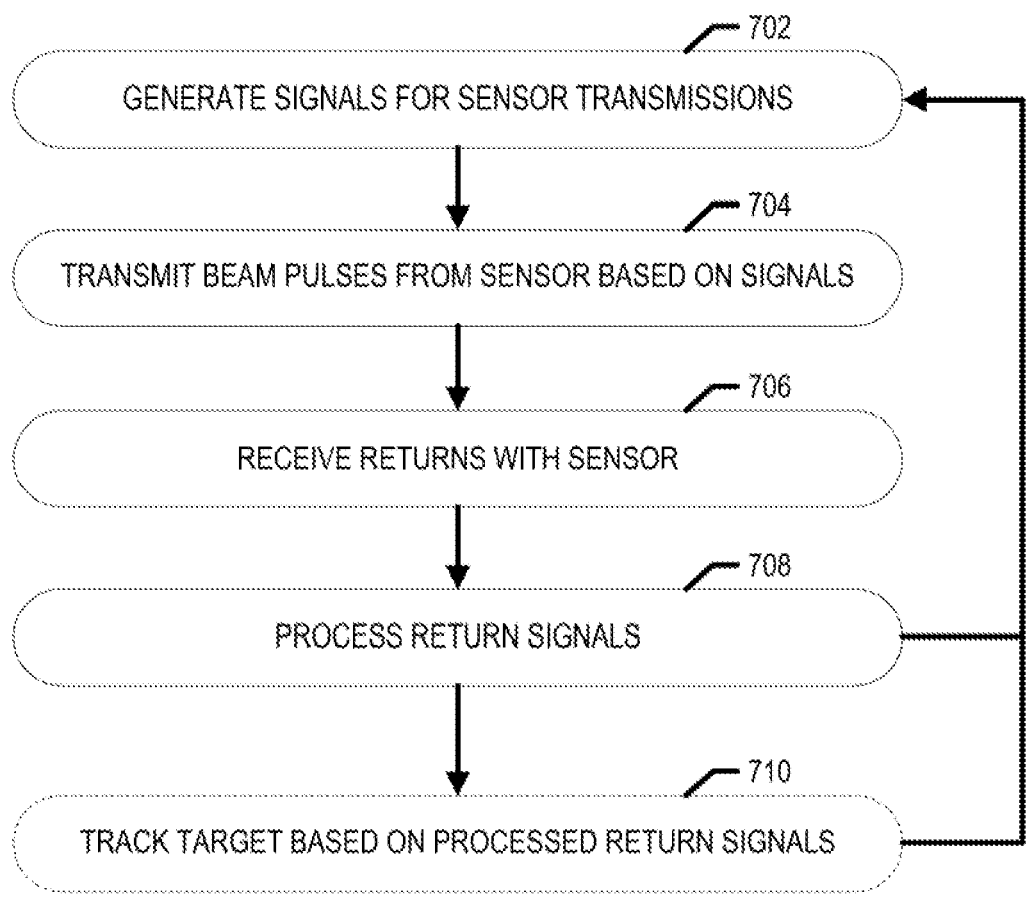
Figure 8:
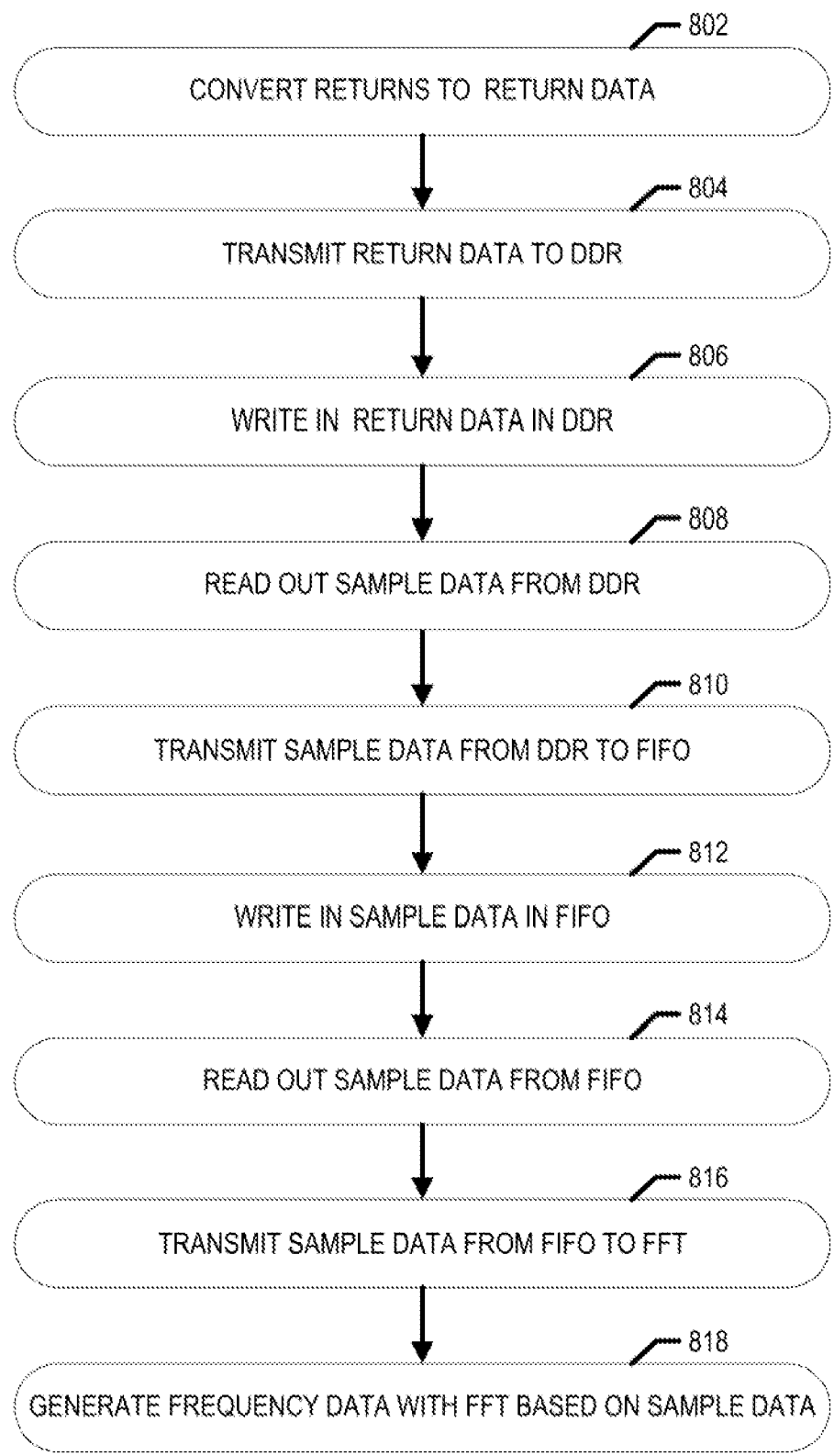

Having thus described certain example embodiments of the present disclosure in general terms, reference will now be made to the accompanying drawings, which are not necessarily drawn to scale, and wherein:

FIG. 1 illustrates an exemplary environment employing a system in accordance with one or more embodiments of the present invention;

FIG. 2 illustrates an example block diagram of a system in accordance with one or more embodiments of the present invention;

FIG. 3 illustrates a sensor of an antenna array in accordance with one or more embodiments of the present invention;

FIGS. 4A & 4B illustrate selected components of a system in accordance with one or more embodiments of the present invention;

FIG. 5 illustrates a DDR in accordance with one or more embodiments of the present invention;

FIG. 6 illustrates a FIFO in accordance with one or more embodiments of the present invention;

FIG. 7 illustrates a flowchart according for an example application that includes example methods in accordance with one or more embodiments of the present disclosure; and FIG. 8 illustrates a flowchart according to an example method for processing sensor return data in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry.

The terms "electrically connected," "electronically coupled," "electronically coupling," "electronically couple," "in communication with," or "in electronic communication with," in the present disclosure refers to two or more elements, modules, circuitry, or components being connected through wired means and/or wireless means, such that signals, electrical voltage/current, data and/or information may be transmitted to and/or received from these elements or components.

Overview

Various embodiments of the present invention are directed to improved apparatuses, systems, and methods for processing sensors returns. The sensor returns described here may include, but are not limited to, radar and sonar returns. As described herein, the processing of these returns may include converting the sensor returns into return data, sampling the return data and storing it in a DDR to generate sample data, processing the sample data through a FIFO that provides the sample data to a FFT to generate frequency data based on the sample data. The frequency data may be used to locate and determine various information about a target.

In various embodiments of the present invention, a sensor may generate return data for one or more channels, with each of the channels processing return data. In embodiments with a plurality of channels, each channel may be associated with return data representing different characteristics of what may be measured by the sensor. For example, a sensor comprised of a phased array may have a first channel associated with the summation of all of the returns received by the antenna array, a channel associated with azimuth measurements, and a channel associated with elevation measurements. The channels may be used to determine a presence of a target as well as the location of the target, such as the target's location in relation to an azimuth and elevation. The return data for each channel may be efficiently processed with the present invention. In various embodiments, the processing may include writing the return data to a memory of DDR, which may include the return data being provided to the DDR as a burst of data of multiple returns. The return data may be stored in the DDR, and then the data stored in the DDR may be read. The sampling may read out sequential samples (e.g., first row, second row, etc. or first column, second column, etc.) or may read out samples estimated to be associated with a target. The sampling data may be provided to a memory configured as for first-in-first-out (FIFO) operation. The FIFO may act as a buffer to store sample data to be processed by a FFT. The speed of the FIFO may be such that the FFT is provided with data at a rate that improves the utilization of the FFT to have the FFT processing the data at a high percentage of utilization. In various embodiments, this higher utilization may be due to the FIFO memory's write and read operations being faster than the DDR memory's write and read operations. In various embodiments, each of the DDR and the FIFO may receive bursts of data, write bursts of data, and read out bursts of data.

In various embodiments, improvements include supplementing DDR memory by using a non-DDR memory as a FIFO. While DDR memory provides an economical memory with comparatively larger size, DDR memory may be prone to slower write or read times compared to other types of memory when using it for corner turning. For example, DDR memory may write fast and read slow or may write slow and read fast. These slow operations may make DDR memory prone to slower times compared to other types of memory. Utilizing a non-DDR memory as a FIFO may further improve the speed of a channel in processing return data, including when sampling return data for sample data.

It should be readily appreciated that the embodiments of the apparatus, systems, and methods described herein may be configured in various additional and alternative manners in addition to those expressly described herein.

Exemplary Systems and Apparatuses

Embodiments of the present invention herein include systems and apparatuses for processing sensor return data, including utilizing multiple memories and fast Fourier transforms.

FIG. 1 illustrates an exemplary environment 100 for a system or apparatus in accordance with one or more embodiments of the present invention. Various embodiments of the present invention may relate to sensors that transmit and receive signals, such as antennas and antenna arrays utilized in radar applications, sonar applications, and the like. FIG. 1 illustrates an exemplary environment 100 of a system or apparatus on an aircraft 110. The system of FIG. 1 is illustrated as being associated with radar. The environment 100 includes the system on an aircraft 110 generating and transmitting a beam 130. It will be appreciated that radar may transmit in more directions than depicted as beam 130, and that the beam 130 may be representative of a portion of the transmissions, such as at the −3 dB points. The beam 130 may not be continuous transmissions but may be comprised of pulses 140 transmitted at regular time periods. When a pulse 140 reaches a target 120, a pulse 140 is reflected as a return 150. In operation, multiple pulses 140 may be transmitted and multiple returns 150 may be received. The returns 150 are received by the system or apparatus and may be processed to determine information about the target 120, including information in relation to the system or apparatus. In various embodiments, the distance, azimuth, and/or elevation to the target 120, the velocity of the target 120, and the like may be determined from the returns 150.

In various embodiments, the pulses 140 are transmitted periodically, and the time period with which pulses 140 are transmitted may vary with the application (e.g., radar, sonar, etc.). An exemplary time period for radar may include transmitting a pulse 140 regularly, such as once each 30 milliseconds. In various embodiments, an exemplary time period may be faster or may be slower.

FIG. 2 illustrates an example block diagram of a system 200 in accordance with one or more embodiments of the present invention. The system 200 illustrated includes a processor 202, memory 204, communications circuitry 206, and input/output circuitry 208, which may be connected via a bus 210 or a plurality of busses 210. The system may also include sensor(s) 220. In various embodiments, the sensor(s) 220 may be connected via the communications circuitry 206 or, alternatively, via bus 210.

The processor 202, although illustrated as a single block in FIG. 2, may be comprised of a plurality of components and/or processor circuitry. The processor 202 may be implemented as, for example, various components comprising one or a plurality of microprocessors with accompanying digital signal processors; one or a plurality of processors without accompanying digital signal processors; one or a plurality of coprocessors; one or a plurality of multi-core processors; processing circuits; and various other processing elements. The processor may include integrated circuits, such as ASICs, FPGAs, systems-on-a-chip (SoC), or combinations thereof. In various embodiments, the processor 202 may be configured to execute applications, instructions, and/or programs stored in the processor 202, memory 204, or otherwise accessible to the processor 202. When executed by the processor 202, these applications, instructions, and/or programs may enable the execution of one or a plurality of the operations and/or functions described herein. Regardless of whether it is configured by hardware, firmware/software methods, or a combination thereof, the processor 202 may comprise entities capable of executing operations and/or functions according to the embodiments of the present invention when correspondingly configured. Therefore, for example, when the processor 202 is implemented as FPGA, the processor 202 may comprise specially configured hardware for implementing operations and/or functions described herein.

The memory 204 may comprise, for example, a volatile memory, a non-volatile memory, or a certain combination thereof. Although illustrated as a single memory in FIG. 2, the memory 204 may comprise a plurality of memory components. In various embodiments, the memory 204 may comprise, for example, a random access memory, a cache memory, a flash memory, a circuit configured to store information, or a combination thereof. The memory 204 may be configured to write or store data, information, application programs, instructions, etc. so that the processor 202 may execute various operations and/or functions according to the embodiments of the present disclosure. For example, in at least some embodiments, a memory 204 may be configured to buffer or cache data for processing by the processor 202. Additionally or alternatively, in at least some embodiments, the memory 204 may be configured to store program instructions for execution by the processor 202. The memory 204 may store information in the form of static and/or dynamic information. When the operations and/or functions are executed, the stored information may be stored and/or used by the processor 202.

In various embodiments, the memory 204 may comprise one or more DDR SDRAM memory modules, which may be referred to as a DDR. In various embodiments, such as with a processor 202 comprised of an FPGA, a DDR may be connected to the FPGA, specifically at one or more memory interfaces of the FPGA. In various embodiments, an FPGA may include a plurality of memory interfaces and a plurality of memories 204.

The communication circuitry 206 may be implemented as any apparatus included in a circuit, hardware, computer program product, or a combination thereof, which is configured to receive and/or transmit data from/to another component or apparatus. The computer program product may comprise computer-readable program instructions stored on a computer-readable medium (e.g., memory 204) and executed by a processor 202. In various embodiments, the communication circuitry 206 (as with other components discussed herein) may be at least partially implemented as part of the processor 202 or otherwise controlled by the processor 202. The communication circuitry 206 may communicate with the processor 202, for example, through a bus 210. Such a bus may connect to the processor 202, and it may also connect to one or more other components of the processor 202. Additionally, or alternatively, the communication circuitry may be at least partially implemented as a part of the sensor 220. The communication circuitry may be comprised of, for example, transmitters, receivers, transceivers, network interface cards and/or supporting hardware and/or firmware/software, and may be used for establishing communication with another component(s), apparatus(es), and/or system(s). The communication circuitry 206 may be configured to receive and/or transmit data that may be stored by, for example, the memory 204 by using one or more protocols that can be used for communication between components, apparatuses, and/or systems.

In various embodiments, the communication circuitry 206 may convert, transform, and/or package data into data packets and/or data objects to be transmitted and/or convert, transform, and/or unpackage data received, such as from a first protocol to a second protocol, from a first data type to a second data type, from an analog signal to a digital signal, from a digital signal to an analog signal, or the like. The communication circuitry 206 may additionally, or alternatively, communicate with the memory 204, the input/output circuitry 208 and/or any other component of the processor 202, such as through a bus 210.

The input/output circuitry 208 may communicate with the processor 202 to receive instructions input by a user and/or to provide audible, visual, mechanical, or other outputs to a user. The input/output circuitry 208 may comprise supporting devices, such as a keyboard, a mouse, a user interface, a display, a touch screen display, lights (e.g., warning lights), indicators, speakers, and/or other input/output mechanisms. The input/output circuitry 208 may comprise one or more interfaces to which supporting devices may be connected. In various embodiments, aspects of the input/output circuitry 208 may be implemented on a device used by the user to communicate with the processor 202. The input/output circuitry 208 may communicate with the memory 204, the communication circuitry 206, and/or any other component, for example, through a bus 210. For example, supporting devices may be connected to load a computer program to memory 204 for execution by the processor 202.

The sensor(s) 220 may include one or more sensors specific to an application. In various embodiments, such as those associated with radar and sonar, the sensors 220 may include one or more antennas, which may in some embodiments be a part of an antenna array. In various embodiments, sensors 220 may include inertial navigation system sensors. In various embodiments, sensors 220 may include global position system sensors (GPS).

In various embodiments, the processor 202 may be an FPGA which may be comprised of one or more microprocessors and/or co-processors and one or more memories, such as block RAM or SRAM. These one or more memories of the FPGA may be configured in a specialized manner, including but not limited to be configured as the FIFOs described herein.

In various embodiments, the memory 204 may comprise a plurality of SDRAM, such as DDR SDRAM, which may be referred to herein as a DDR or DDR memory.

In various embodiments, one or more DDRs and one or more FIFOs are electronically coupled to each other or in electronic communication such that data may be transmitted between the DDRs and the FIFOs. Additionally, one or more FIFOs and one or more FFTs are electronically coupled to each other or in electronic communication such that data may be transmitted between the FIFOs and the FFTs.

FIG. 3 illustrates a sensor 220 of an antenna array 300 in accordance with one or more embodiments of the present invention. The antenna array 300 illustrated may be a phased array antenna. It will be appreciated that the present invention is not limited to sensors 220 expressly described herein but also applies to other sensors, including other antenna array configurations, not explicitly illustrated herein.

In various embodiments, the antenna array 300 may include a mounting surface 302 for mounting a plurality of antennas 310. While a rectangular antenna array 300 with sixty antennas 310 is illustrated by FIG. 3, it will be readily appreciated that additional shapes of antenna arrays 300 are contemplated with the description herein.

The mounting surface 302 may include a plurality of antenna 310, and each antenna 310 may be disposed at a respective position separated by a regular or irregular spacing on the mounting surface 302. For instance, the antenna array may include a plurality of antenna 310 disposed (e.g., placed, mounted, etc.) on the mounting surface 302. While the antenna 310 are illustrated with circles, it will be readily appreciated that other shapes are within the scope of the present invention, include square, spirals, linear shapes, etc.

The mounting surface 302 may be comprised of a plurality of mounting surfaces, which may or may not be connected, and this may be referred to as having multiple panels. In this manner, the antenna array 300 may include one or more antennas 310 or portions 320 of the antenna array 300 that are oriented in the same direction and/or different directions.

In various embodiments, the antenna array 300 includes a plurality of antennas 310, which may also be referred to as antenna elements. Each of the antennas 310 may be individually addressable. As such, each antenna 310 may be configured to transmit a different, similar, or same signal as another antenna 310 of the antenna array 300.

In various embodiments, the plurality of antennas 310 of the antenna array 300 may each receive a signal configured to allow for, for example, beam steering. In an embodiments with N antennas, beam steering may include providing each of the antennas 310N with a specific signal for the individual antenna 310 such that the beam transmitted from the antenna array 300 may be directed in a particular direction, such as by utilizing characteristics of the transmissions (e.g., phase, amplitude, frequency, etc.) to direct a beam. Similarly, by using beam steering, an area may be scanned by directing the beam to sweep in one or more directions.

The plurality of antennas 310 maybe associated with one or more portions 320 of the antenna array 300, such as a first portion 320A of the antenna array 300, a second portion 320B of the antenna array 300, a third portion 320C of the antenna array 300, and a fourth portion 320D of the antenna array 300. While FIG. 3 illustrates four portions 320, additional or fewer portions may be present, including portions based on an operation to be performed by grouping the antennas 310 of the antenna array 300, examples of which are described herein. Additionally, one antenna 310 may be a part of more than one portion 320 of the antenna. The processor 202 may also define or redefine portions 320 of the antenna array 300 based on one or more operations to be performed, which may include adding or subtracting returns from one or more of the antennas with the returns from one or more other antennas.

In various embodiments, the first portion 320A of antenna array 300 and the second portion 320B of the antenna array 300 may be associated with a top portion of the antenna array, and the third portion 320C of antenna array 300 and the fourth portion 320D of the antenna array 300 may be associated with a bottom portion of the antenna array. Some operations may use the top portion and the bottom portion to make a comparison of the returns received by the antenna 300. Such comparisons may include subtracting the signals received from the top portion and the bottom portion or subtracting the bottom portion from the top portion. The signals from the top portion and the bottom portion may also be added together, which may be a summation of the top portion and the bottom portion. In various embodiments with antenna array 300 having additional portions (e.g., three portions, four portions, five portions, etc.), the various portions may be compared via such operations, including addition and subtraction.

In various embodiments, the first portion 320A of antenna array 300 and the third portion 320C of the antenna array 300 may be associated with a left portion of the antenna array 300, and the second portion 320B of antenna array 300 and the fourth portion 320D of the antenna array 300 may be associated with a right portion of the antenna array 300. Some operations may use the left portion and the right portion to make a comparison of the returns received by the antenna. Such comparisons may include subtracting the signals received from the left portion and the right portion or subtracting the right portion from the left portion. The signals from the left portion and the right portion may also be added together, which may be a summation of the left portion and the right portion.

The subtraction of the left portion from the right portion may generate data returns associated with an azimuth, and the resultant data may be provided via one or more channels. Azimuth data may be used to determine an angle and how far off a target is from straight ahead in a horizontal plane. For example, in an application of radar for an automobile, azimuth data may be used to determine if an oncoming car (i.e., a target) is to the left or right of the automobile containing the system 200 with the radar sensor 220.

The subtraction of the top portion from the bottom portion may generate data returns associated with an elevation, and the resultant data may be provided via one or more channels. Elevation data may be used to determine an angle and how far off a target is from a straight ahead in a vertical plane. For example, in an application of radar for an automobile, elevation data may be used to determine if an oncoming target 120 is above (e.g., an overpass, tunnel, etc.) or below (e.g., pothole, etc.) the automobile containing the system 200 with the radar sensor 220.

In various embodiments, the azimuth data and the elevation data may be used to track a target 120 over time, such as the time between transmission of pulses 140. The tracking may be revisited with each transmission of pulses 140 to determine the location of the target 140, where the target 140 is estimated to be traveling, and if there is estimated to be a collision with the target 140.

The summation of all of the antennas, such as a summation of a top portion and a bottom portion or the summation of a left portion and a right portion, may be provided via one or more channels, which may be referred to as a sum channel.

The subtraction operations and/or summation operations associated with data returns may be performed via circuitry, via a processor executing source code, or the like. The resultant data may be generated based on the subtraction operation(s) and/or summation operation(s), and this resultant data may be provided to a channel for further processing.

In various embodiments, the sensor 220, such as antenna array 300, may also include signal processing circuitry (not illustrated) that processes the returns from an analog signal into a digital signal. The signal processing circuitry may include, but is not limited to, transmitters, receivers, transceivers, amplifiers, filters, analog-to-digital converters (ADCs), digital-to-analog converters (DACs), and the like. The sensor 220 may include sensor processing circuitry to receive the returns 150 at each of the antennas 310 of the antenna array 300. In various embodiments, such signal processing circuitry may be referred to as a sensor controller. Sensor processing circuitry or a sensor controller may compare or cause the comparison (e.g., subtract, add, etc.) of return signals received by the plurality of antennas 310, including outputting digital data returns to the other portions of the system 110, such to different channels. The sensor processing circuitry or sensor controller may also generate and/or distribute signals to transmit to each of the antennas 310 of the antenna array 300.

Additionally, or alternatively, some or all of the circuitry for the sensor processing circuitry or sensor controller of sensor 220 may be located in the communications circuitry 206, including but not limited to ADCs, filters, amplifiers, etc., particularly when the location of a sensor 220, such as an antenna array 300, may be located on the exterior of, for example, an aircraft 110 or an automobile where additional space for sensor processing circuitry must be located remotely from the sensor 220.

FIGS. 4A & 4B illustrate selected components of a system 200 in accordance with one or more embodiments of the present invention. The selected components illustrated include components for multiple channels 410 for processing sensor returns.

FIG. 4A illustrates three channels 410A, 410B, and 410C with each channel including a FFT 440. In various embodiments, each channel 410 may include a DDR 420, a FIFO 430, and a FFT 440. As illustrated, the first channel 410A may include a first DDR 420A, a first FIFO 430A, and a first FFT 440A, the second channel 410B may include a second DDR 420B, a second FIFO 430B, and a second FFT 440B, and the third channel 410C may include a third DDR 420C, a third FIFO 430D, and a third FFT 440C.

FIG. 4B illustrates three channels 410A, 410B, and 410C with each channel 410 sharing a FFT 440. In various embodiments, each channel 410 may include a DDR 420 and a FIFO 430. As illustrated, the first channel 410A may include a first DDR 420A and a first FIFO 430A, the second channel 410B may include a second DDR 420B and a second FIFO 430B, and the third channel 410C may include a third DDR 420C and a third FIFO 430D. Each of the channels 410A, 410B, 410C may share a FFT 440. The FFT 440 may sequentially address each of the channels 410A, 410B, 410C to perform a fast-Fourier transform of the data provide to the FFT 440.

The channels 410 may be used to generate frequency data by processing return data and/or to generate data for troubleshooting. Further, in various embodiments, each portion of a sensor (e.g., 320A, 320B, 320C, and 320D) may be associated with its own channel 410. Additionally, or alternatively, there may be one or more additional channels 410 to provide for an additional channel that may be utilized if a problem is encountered in a channel 410, which may allow for the system 110 to switch to the additional channel 410.

A channel 410 may include DDR 420. In various embodiments, the DDR 420 may be located in the memory 204, which may be separate from a processor 202, such as an FPGA. In various embodiments, such as with a processor 202 of an FPGA, the memory 204 including a DDR 420 may be a SODIMM (small outline dual in-line memory module) that may be mounted to the FPGA via a SODIMM interface or the like.

A channel 410 may include a FIFO 430. In various embodiments, a FIFO 430 may be some or all of a memory, such a memory 204 of FIG. 2, a memory in the processor 202, or the like. The FIFO 430 may be a memory configured to write and read out data received in a first-in-first-out manner.

In various embodiments, the FIFO 430 may be a memory of an FPGA. The FPGA may include block ram (a.k.a. BRAM), which may comprise SRAM configured for different operations. The BRAM may be configured for first-in-first-out (FIFO) operations, which may be referred to herein as a FIFO. In various embodiments, configuring the BRAM as a FIFO may allow for receiving and holding data in the FIFO and then transmitting or reading out the data based on which data was received first. In various embodiments, data will be received sequentially in a data object, data package, or data packet. In various embodiments, the data received may be written to one row of the FIFO at a time. In various embodiments, a receiving data may including receiving a data object, data, package, or data packet with a burst of data, such as 8 rows of data, which may be written to the FIFO. Data may be read out of the FIFO one or more rows at a time, including as a burst of data.

In various embodiments, the FIFO 430 may be configured as an intermediary memory that may receive data in one format and output data in another format. In various embodiments, data may be received as burst in of data that may be read out one row at a time. In various embodiments, the data may be received as a burst in of a row of data and then read out as a column of data. As such, the FIFO 430 may be specialized in the way the FIFO 430 is written with data and the data is read out. A manner in which the data is received may be based on what in a channel 410 is transmitting data to the FIFO 430, and the manner in which the data is transmitted may be based on what in a channel the FIFO 430 is transmitting data to. In various embodiments, FIFO 430 may be implemented in a DDR memory.

A channel may include a FFT 440. In various embodiments, the FFT 440 may refer to one or more components of the system 110 configured to perform a fast Fourier transform. This may include some or all of processor 202 and/or memory 204. In various embodiments, the FFT 440 may be a portion of an FPGA. The fast Fourier transform may be used to generate, or convert, frequency data from time domain data. For example, sample data transmitted to the FFT may be used to generate frequency data based on the sample data. The frequency data may utilized to located and/or track a target 120, including by determining range and velocity of a target 120.

In various embodiments, a FFT 440 may be able to process sample data faster than the sample data could be readout and transmitted from a DDR 420. Thus the DDR 420 may be a bottleneck for processing data returns that reduces the bandwidth of the system 200. The bottleneck may be due to operations performed in reading out data from the DDR 420, such as in various embodiments configured with performing a corner turn operation for reading out sample data from the DDR 420. A corner turn operation may refer to the operations of reading in data in rows (or columns) of a memory (e.g., DDR 420) and the reading out data from columns (or rows) of the memory. In other words, a corner is being turned as the data may, in various embodiments, goes into the memory horizontally and comes out vertically. Various embodiments may use a FIFO 430 to receive sample data from the DDR 420 and provide the sample data to the FFT 440. Once the FFT 440 is receiving sample data, the various embodiments using a FIFO 430 may continue to provide the FFT 440 with sample data with improved efficiency and improved bandwidth for processing the returns. In various embodiments, the speed of the application (e.g., radar, sonar, etc.) may be associated with the rate of processing of the returns, which may include applications using higher frequencies of transmits utilizing faster processing.

The data processing for one channel 410 may begin with return data being transmitted to and received by a DDR 420. The DDR 420 may, on receiving one or more return data, may read out samples of the return data as sample data that is transmitted to a FIFO 430. The FIFO 430 may receive the sample data and write the sample data to the FIFO 430. The FIFO 430 may then read out and transmit the sample data to a FFT 440 for processing, including generating frequency data from based on the sample data using a fast Fourier transform. In various embodiments, the FIFO 430 and FFT 440 may be part of an FPGA while the DDR 420 may not be part of the FPGA but may be mounted to the FPGA.

In various embodiments, and not illustrated in FIG. 4A or 4B, one or more channels may be connected to one or more components between the components illustrated in FIG. 4A or 4B. For example, a channel 410 (e.g., the sum channel) may read out after the DDR 420 and before the FIFO 430. The read out may be input into the processor 202 performing a logarithmic magnitude (a.k.a. log mag) operation, which may utilize a logarithmic algorithm to generate magnitude data of the magnitude of the data of the sum channel being read out. The return data for a channel may include complex data, including a first portion of bits associated with a real value and a portion of bits associated with an imaginary value. A logarithmic algorithm may be utilized as the sum channel data is complex data and the log mag data converts the data into non-complex data. The output of the log mag operation may generate log mag data that may be visualized. Such visualization may be used for, among other things, troubleshooting. Such a visualization may depict an indication of the presence of a target, and may also allow for the visualization to occur before all of the returns are finished processing. A visualization the log mag data may be used for debugging, such as confirming that processing circuitry (e.g., ADCs, etc.) are performing correctly.

FIG. 5 illustrates a DDR 420 in accordance with one or more embodiments of the present invention. The DDR 420 may be comprised of a plurality of memory cells, with a memory cell configured to store 1 bit. The memory cells may be arranged into rows and columns, and each memory cell may be accessed by reference to its row and column or a range of rows and/or columns including the address of the memory cell(s).

In various applications, the return data provided to each channel 410 may be based on a time period, such as a time period associated with an application. For example, in radar applications, data may enter a DDR 420 of each channel 410 based on the timing of a receipt of pulses, which may be associated with the time period at which pulses 140 are transmitted. The first column of a row may be a time zero or a first increment of time and the last column of a row may be the last increment of time before a new pulse 140 is transmitted. Then a subsequent row of the DDR 420 may be associated with return data for a subsequent time period. In this manner, return data at a certain column of a row will be associated with the amount of time from a transmission of a pulse 140 to the receipt of a return 150, which represents a distance traveled by the pulse 140 and the return 150. In various applications where the medium of transmission of pulses 140 and returns 150 is known, the range of a target may be determined by the system 200 based on the return data. For example, various embodiments may include a spike in the return data that may indicate the presence of a potential target 120. Additionally, multiple rows of return data in the DDR 420 being associated with progressive periods of time, the processing of related data returns, such as those in similar columns (i.e., ranges) allows for the determination of change in range over time, which may allow for the determination of a velocity. The system 200 processing the return data, including sampling the return data, may allow for the determination of a presence of one or more targets 120 as well as a range and velocity of one or more targets 120.

The DDR 420 of FIG. 5 illustrates a memory comprised of a plurality of rows 510, and each of the rows is comprised of a plurality of columns (not illustrated). In various embodiments, the size of the memory available in the DDR 420 may be defined by the number of rows and columns. In an example, a DDR 420 may be comprised of height 500H of 256 rows and width 500W of 1024 columns, with each row and each column being one bit. It will be appreciated that each row and column may contain one bit. In other words, one row 510 may be of a width 500W that includes 1024 bits of data and one column may contain 1024 bits of data. It will be readily appreciated that, continuing with this example, the first row 510A may be referred to as row 0 and that the last row 510N may be referred to as row 255, and that similarly the first column may be referred to as column 0 and the last column may be referred to as column 1023.

The first row 510A of the DDR 420 illustrated in FIG. 5 may represent a first address to be filled. Thus, in various applications utilizing radar or sonar, for example, the first row 510A may represent the start of a time period (e.g., time zero) associated with a pulse 140, and each sequential horizontal row represents a new pulse in time. In various embodiments, the pulses may be occurring at regular periods of time. For example, a new row 510 may represent a new pulse being transmitted, which may be occurring every 30 microseconds.

For a DDR 420 associated with a channel 410, the DDR 420 may be divided into a plurality of portions 520. For example, a DDR 420 may be divided into a first portion 520A and a second portion 520B. In various embodiments each of the portions 520 may be same size. Alternatively, in various embodiments, one or more portions may be different sizes.

In various embodiments, and in operation, for a given channel, return data may be written into the rows 510 of a first portion 520A of the DDR 420. Once the first portion 520A of the DDR 420 is filled, then the data may be written into the rows of the second portion 520B of the DDR 420. While data is being written in, data may not be read out of the same cells, same rows, and/or same columns.

Dividing the DDR 420 in portions 520, data in a portion 520A (or 520B) of the DDR may be read out while data in another portion 520B (or 520A) may written in. Thus the first portion 520A and the second portion 520B may provide for the DDR 420 to write to and read out memory at the same time from different portions 520. In the two portions of FIG. 5, this may be referred to as having upper address lines of portion 520A and having lower address lines of portion 520B. In various embodiments, writing in to one portion 520A (or 520B) may not slow down a read out operation of a second portion 520B (or 520A).

After return data is written into the first portion 520A and the first portion 520A is full, then return data may be written into the second portion 520B until it is filled, and the first portion 520A may be filled again. Thus the process of writing in and reading out data may switch back and forth between the portions 520 of the DDR 420, which may be referred to as a ping-pong of the DDR 420 as the it may toggle between the portions 520. In various embodiments, the ping-pong of the DDR 420 may allow for a continuous flow of data into and out of the DDR 420.

In various embodiments, a time to fill a portion 520 of the DDR 420 may take approximately 200 milliseconds, and the ping-pong between reading in and reading out may occur every 200 milliseconds.

In various embodiments not illustrated, each of the first portion 520A and the second portion 520B may be further subdivided into sub-portions, with each sub-portion be associated with a channel 410. For example, in various embodiments with three channels, the first portion 520A may be comprised of three sub-portions and the second portion 520B may be comprised of 3 sub-portions, which each of these sub-portions being separately written into and read out of. The DDR 420 may cycle through each of the sub-portions instead of ping-ponging between two portions.

In various embodiments, operations of writing the data in and/or reading the data out may also involve overhead bits of data that are additional bits associated with return data for a channel. The overhead bits may include bits specifying a row and/or column. This may be referred to row address strobe (RAS) and column address strobe (CAS) in some embodiments. The overhead data may specify RAS and CAS to write in or read out for respective row(s) and column(s) along with the DDR 420 of the channel to write to. Increasing the amount of the payload of return data for every overhead bit, allows for a higher bandwidth by reducing the amount of overhead data needed. For example, a burst of 8 bytes of return data may be more efficient than a burst of 4 bytes as each burst may include overhead bits and by including additional bits of data returns the overhead bits may be reduced for the same amount of return data being read into and/or out of a DDR 420, which may increase bandwidth by lowering the overhead bits required.

In various embodiments, a DDR 420 may receive return data from a sensor 220, such as from an antenna array 300, and the return data received may be in a burst that contains a large amount of return data. The DDR 420 may receive and write in the return data in a plurality of memory cells comprising the DDR 420. After being stored, the DDR memory cells may be read out as sample data, which may be from a read out operation reading out rows of DDR memory cells or may be read out as columns of DDR memory cells. Each row or column of DDR memory cells may be read out one row or column at a time. Additionally, the DDR memory cells of DDR 420 may be divided into a first portion 520A and a second portion 520A, and the writing of return data in memory cells may be in the first portion 520A while the reading out of sample data may be of a second portion 520B of the memory cells of DDR 520B.

In various embodiments, the sample data may be read out of the DDR 420 in columns 530 (e.g., 530A, 530B). For example, after a first portion 520A of the DDR 420 is filled, a column 530A may be read out of the first portion 520A. The width 532A of the column 530A may be based on an application (e.g., radar, sonar, etc.) and/or the processing capabilities of one or more components of a channel 410 or a system 200. In various embodiments, the width 532A of column 530A may be 8 bytes wide. With a column 530A with 8 bytes wide (and 1 byte being 8 bits), there would be 16 columns for the 1024 bits of data stored on one row. In various embodiments, the width 532A of column 530A may be 4 bytes wide. With a column 530A with 4 bits wide, there would be 32 columns for the 1024 bits of data stored on one row. While a single column 530 is illustrated for first portion 520A of the DDR 420, it will be readily appreciated that there are a plurality of columns 530 associated with the first portion 520A. The columns 530 of a portion 520 of a DDR 420 may be read out sequentially or according to one or more operations selecting specific columns to read out. In various embodiments, the reading in of data in rows 510 and the reading out of data in columns 532 may be referred to as corner turn operation or turning the corner operation.

Targets 150 closer to the system 110 may generate a pulse return 150 closer in time to the transmission of the pulses 140, which may be in a lower number column, which may be associated with how far away a target 120 is away from the system 110. Reading out data of a column 532A reads out similarly timed return pulse data from multiple rows 510 of the vertical column, which may allow for a determination of a velocity. Thus, for a set of data returns, reading out a column 532A may allow for determination of a range or distance of a target 120 as well as a velocity of a target 120. The velocity may be determined from the FFT output data, which may be associated with a Doppler map allowing for a determination of velocity.

FIG. 6 illustrates a FIFO 430 in accordance with one or more embodiments of the present invention. The FIFO 430 may be comprised of a plurality of memory cells, with a memory cell configured to store 1 bit of memory. The memory cells may be arranged into rows and columns, and each memory cell may be accessed by reference to its row and column. A FIFO 430 as illustrated in FIG. 6 may include a plurality of rows 610A-N, which may be divided into a plurality of portions. In various embodiments, a FIFO 430 may be comprised of a first portion 620A and a second portion 620B. In various embodiments, a row 610A of a FIFO 430 may be comprised of 1024 bits of data.

A FIFO 430 may receive sample data read out of a DDR 420 to be written into or stored in the FIFO 430. The FIFO 430 may write in or store sample data as the data is first received, and the data first received may be the first data read out. In various embodiments, a FIFO 430 may be sized in relation to an FFT 440, including to store a number of bits based on the speed of the FFT 440 may receive and process data read out from the FIFO 430.

In various embodiments, after data has been written to and/or stored in the first portion 620A of the FIFO 430, the data may be moved from a first portion 620A of the FIFO 430 to a second portion 620B of the FIFO 430 for being read out. Once the second portion 620B of the FIFO is filled then the data may be read out and transmitted to the FFT 440 from the second portion 620B. While the data is read out, additional data may be written into and/or stored in the first portion 620A of the FIFO 430.

In various embodiments, a FFT 440 may receive and process data much faster than the DDR 420 may output, and one or more FIFOs 430 may improve the efficiency and bandwidth of a system 110 for processing data by an FFT 440 with the utilization of the FIFOs 430. In various embodiments, a channel may include one FIFO 430. Alternatively, various embodiments may include a plurality of FIFOs 430 per channel. The FIFOs 430 may be filled with data from a DDR 420, and then a FFT 440 may read data sequentially from each FIFO 430 for a channel before returning to the beginning of a cycle and starting with the first FIFO 430 of a channel. The data stored in a FIFO 439 may be read out of the FIFO 430 sequentially—the first data in is the first data read out. The number of FIFOs 430 may be based on the number and speed of DDRs 420 and the speed of the FFT 440 to process data as well as the number of FFTs 440 associated with a channel 410.

In various embodiments, a first FIFO 430 may be read out while a second FIFO 430 is writing in or storing data. Once the data from the first FIFO 430 has been read out and transmitted to a FFT 440 then the second FIFO 430 may be read out and transmitted while the first FIFO 430 may write in and store data, such as to a portion of the first FIFO 430. In such a manner, two or more FIFOs 430 may be used with on FFT 440.

In various embodiments, an FFT 440 may be operating at approximately 160 MHz as it processes data read out of FIFOs 430. There may be a plurality of FIFOs 430, such as eight FIFOs 430, and each may be read sequentially with one FIFO 430 being read after another. After an FFT 430 finishes reading data out of a FIFO 430 and transmitting it to the FFT 440, there may be a small amount of time to before one or more operations are executed to read out and transmit data from the next FIFO 430 to the FFT 440. In various embodiments, the utilization of the FFT 430 may be greater than a 95%+ utilization rate. In such embodiments, a 95%+ utilization rate may include utilizing components of the FFT 430, which may include memories, multipliers, and/or logic.

Having generally described embodiments in accordance with the present invention, several exemplary operations according to exemplary embodiments will be described.

Exemplary Operations

In some example embodiments, and according to the operations described herein, the system 110 may be used to transmit beam pulses 140, receive returns 150, and process the returns 150 as described herein. While the following flowcharts and related description includes multiple operations, it is readily appreciated that some of the following operations may be omitted, some of the operations may be repeated or iterated, and that additional operations may be included. Additionally, the order of operations should not be interpreted as limiting as the order of these operations may be varied.

FIG. 7 illustrates a flowchart according for an example application that includes example methods in accordance with one or more embodiments of the present disclosure.

At operation 702, signals are generated for sensor transmissions. A sensor controller may generate one or more signals that may be transmitted via a sensor 220, such as an antenna array 300. The sensor controller may be included in the sensor 220 and/or the communication circuitry 206, which may be controlled by the processor 202 and one or more computer programs or instructions stored in the memory 204.

In various embodiments, a sensor controller may generate one signal that may be associated with the sensor 220. The one signal may be for the sensor to transmit a beam pulse. In embodiments with a plurality of antennas 310 in an antenna array 300, the one signal may be transmitted by the each of the antennas 310 of the antenna array 300 or for a portion of the antennas 310 of antenna array 300. After the signal is generate, a time period may be waited before generating another signal.

In various embodiments, a sensor controller may generate a plurality of signals, and each of the plurality of signals may associated with one or more of a plurality of antennas 310 of an antenna array 300. The signals may include a separate signal for each of the antennas 310 of an antenna array 300, which may cause the sensor 220 to generate a beam 130 that may be steered or shaped, which may allow for the tracking of a target.

In various embodiments, the one or more signals generated may be based on a prior determination of a location of a target, a range of a target, and/or a velocity of a target. Such signals may be used by a system 200 to track a target 120 by steering a beam 130 in a direction in which a target is determined to be heading.

At operation 704, the sensor 220 may transmit beam pulses 140 based on the signals. The signals, having been received at the sensor 220, may be converted from a signal into a beam pulse 140 that may travel through a medium, such as air or water. The beam pulse 140 may be transmitted until it is reflected by a target 120.

At operation 706, returns 150 may be received with the sensor 220. After a beam pulse 140 is reflected by a target 120, the reflection may be received as a return 150.

In various embodiments, the returns 150 may be received by a plurality of antennas 310 of an antenna array 300. Each of the antennas 310 of the antenna array 300 may receive a return 150 that may be different or the same from a return 150 received by another antenna 310 of the antenna array 300. Variations in the returns 150 received may be based on a position of the antenna 310 from a target (e.g., distance, angle, etc.), the medium of propagation (e.g., air, water, etc.), the frequency of the reflection, etc. When received, the returns 150 will be converted to an electrical signal by the antenna(s) 310.

At operation 708, the return signals may be processed. The processing of return signals may be the system 200 as described herein, including by using one or more channels 410 to generate frequency data. The one or more channels may each be comprised of a DDR 420, a FIFO 430, and a FFT 440. In various embodiments, the returns signals may be converted into a return data for processing. For example, the electrical signal may be converted into a digital signal, which may be transmitted to one or other portions of the system 110. Before or during transmission, the electrical signal may be used to generate return data that may be packetized into a data packet or data object such that the return data may be transmitted to a channel as bursts of data. In various embodiments this may occur at a sensor controller, which may be located at or in the sensor 220 or it may occur in the system 200 outside of the sensor 220.

At operation 710, a target 120 may be tracked based on the processed return signals. In various embodiments, the frequency data generated from the processed return signals may be used to track a target 120, including locating a target 120, determining a range or distance of a target 120, and determining a velocity of a target 120. The tracking of a target 120 may be further used by the system 200 to determine if the system 110 may collide with the target 120. Additionally, or alternatively, the tracking of a target 120 may be used to generate one or more signals to generate a beam 130 for further tracking the target 120.

FIG. 8 illustrates a flowchart according to an example method for processing sensor 220 return data in accordance with one or more embodiments of the present disclosure.

At operation 802, returns 150 may be converted to return data. In various embodiments, the returns 150 may be converted into a signal return data for processing as described herein.

At operation 804, return data may be transmitted to a DDR 420. The return data, having been converted, may be transmitted to a DDR 420. In various embodiments, the return data may be transmitted in a data packet or data object comprising a burst of return data containing more return data than associated with a signal return's 150 worth of return data. Alternatively, the return data may be serially transmitted to the DDR 420 as the return signals are converted to return data.

In various embodiments, the return data may include only the return data from conversion of a single return 150 without additional data. Alternatively, the return data may include additional data in addition to the return data converted from a return 150, which may include but is not limited to header data, prefix data, footer data, suffix data, and/or metadata. The system 110 may route the return data to one or more of a plurality of channels 410 or DDRs 420 based on the additional data. The additional data may also identify if one or more operations has already occurred on the return signals, such as subtracting and/or adding the returns of one or more antennas together. In various embodiments, the operations performed already may be indicated by additional data indicating if the return data is associated with azimuth data, elevation data, and/or sum data.

At operation 806, return data may be written into a DDR 420. The return data, having been transmitted and received by the DDR 420, may be written or stored in the DDR 420, such as described herein. In various embodiments, the DDR 420 may be in memory 204, such as one or one or more memory modules, or may be in processor 202, such as on an FPGA.

In various embodiments, writing or storing return data in a DDR 420 may be based on how the data is transmitted to the DDR 420, such as sequentially or by a data burst. In various embodiments receiving data at the DDR 420 sequentially, the return data may be stored by filling a plurality of rows of memory cells in the DDR 420 sequentially in a continuous manner. In various embodiments receiving data at the DDR 420 in data bursts, the return data may be stored one data burst at a time, which may fill multiple rows of memory cells in the DDR to store a first data burst before proceeding to fill rows from a second data burst.

In various embodiments, the return data received at the DDR 420 may include data in addition to the return data, and this additional data may or may not be removed before storing the return data in the memory cells of DDR 420.

In various embodiments, a DDR 420 may include a plurality of portions 520 of the DDR 420. The DDR 420 may write in or store return data in a first portion 520A and fill the first portion 520A of the DDR 420 before filling a second portion 520B of the DDR 420. The DDR 420 may cycle between each of the portions of the DDR 420 when writing in or reading out data. In various embodiments, while the DDR 420 is writing in or reading out data into a portion (e.g., 520A) of the DDR 420, the DDR 420 may be reading out another portion (e.g., 520B) of the DDR 420. In this manner, the DDR 420 may ping-pong between different portions (e.g., 520A, 520B, etc.) of the DDR 420 in writing in data to memory cells of the DDR 420 and reading out data from the memory cells of the DDR 420. In various embodiments, such ping-pong operations may allow a DDR 420 to receive a burst of data to write in or store as multiple rows and, at the same time, read out single rows and/or columns of sample data.

At operation 808, sample data may be read out from DDR 420. In various embodiments, the DDR 420 may read out data stored in the memory cells of the DDR 420 as sample data. The sample data may be generated from reading out one row at a time, multiple rows at a time, one column at a time, and/or multiple columns at a time. For example, a column of multiple bits may be read out, with each of the bits generating one or more data packets or data objects of sample data.

As described herein, the sample data may be, among other things, one row of data stored in the DDR. Alternatively, the sample data may be a column of data stored in the DDR, where the column may have a column width of multiple bits of data. In an example, the column width may be 8 bits. In another example, the column width may be 4 bits. In yet another example, the column width may be 16 bits. In various embodiments, the sample data read out of the DDR 420 may be packetized into a data packet and/or data object or, alternatively, may be serially read out without being packetized.

At operation 810, sample data from the DDR 420 may be transmitted to a FIFO 430. The DDR 420 may be in the same block as illustrated in FIG. 2 as FIFO 430 or in a different block from the FIFO 430. The system 200 may cause the transmission of the sample data read out of the DDR 420 to be transmitted to the FIFO 430. In various embodiments, this operation may include adding or appending data to the sample data to direct the sample data from the DDR 420 to a FIFO 430.

At operation 812, sample data may be written in to a FIFO 430. The FIFO 430, having received sample data transmitted from a DDR 420 may store the sample data. The FIFO 430 may write in or store data as it comes in such that the first data in will be the first data read out. The FIFO 430 may sequentially write in data, such as into sequential rows. In various embodiments, the FIFO 430 may be comprised of a plurality of portions, such as a first portion 620A and second portion 620B. As the first portion 620A of the FIFO 430 is filled then the sample data may be moved to a second portion 620B. Alternatively, in various embodiments once a first portion 620A is filled then the FIFO 430 may begin writing data until a second portion 620B is filled.

At operation 814, sample data may be read out from a FIFO 430. The sample data may be read out in an ordered manner such that the first data input into the FIFO 430 may be the first data read out of the FIFO 430. The data may be read out one row at a time.

At operation 816, the sample data may be transmitted from the FIFO 430 to the FFT 440. In various embodiments, the FIFO 430 and the FFT 440 may be located on an FPGA. Alternatively, the FIFO 430 and the FFT 440 may be located on different portions of the system 200, such as in memory 204 and processor 202, respectively.

In various embodiments, each FIFO 430 may be associated with and transmit sample data to an associated FFT 440, such as according to associated illustrated in or described in regard to FIG. 4A.

In other embodiments, a FFT 440 may be associated with more than one FIFO 430, including FIFOs 430 from more than one channel 410. The transmission of data from these FIFOs 430 may be timed or coordinated, such as via the processor 202, to occur in a sequential manner such that a FIFO 440 may receive sample data from a first FIFO 430A, then a second FIFO 430B, then a third FIFO 430C, etc. and then starting again with the first FIFO 430A.

At operation 818, the FFT 440 may generate frequency data based on sample data. The FFT 440 may receive the sample data from the FIFO 430 and by utilizing a fast Fourier transform generate frequency data based on the sample data. The frequency data may be used by the system 200 to locate and/or track a target 120.

Operations and/or functions of the present invention have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

Thus, while particular embodiments of the subject matter have been described, other embodiments are within the scope of the following claims.

The invention claimed is:

1. A system comprising:
    a first channel of one or more channels, wherein the first channel comprises a first DDR memory, a first FIFO, and a first FFT;
    an FPGA comprising at least the first FIFO and the first FFT;
    wherein the first DDR memory is configured to receive a burst of return data from at least one sensor, to store the burst of return data in a plurality of first DDR memory cells, to read out sample data from the plurality of first DDR memory cells, and to transmit the sample data to the first FIFO;
    wherein the first FIFO is configured to receive the sample data from the first DDR memory, to store the sample data in a plurality of first FIFO memory cells, to read out sample data stored in the plurality of first FIFO memory cells in an order the sample data was stored, and to transmit the read out sample data from the first FIFO to the first FFT;
    and wherein the first FFT of the first channel is configured to generate frequency data based on the sample data transmitted from the first FIFO.

2. The system of claim 1, wherein the first DDR memory is further configured to store the burst of return data in the first DDR memory in a plurality of rows and to read out sample data from columns of the plurality of first DDR memory cells.

3. The system of claim 1, wherein the system is comprised of at least three channels, and wherein the first channel is associated with return data representing azimuth data, a second channel is associated with return data representing elevation data, and a third channel is associated with return data representing sum data.

4. The system of claim 1, wherein the system is comprised of at least four channels.

5. The system of claim 1, wherein the system is configured to locate a target based at least on the frequency data.

6. The system of claim 5, wherein the system is further configured to determine a range and a velocity of the target based on the frequency data.

7. The system of claim 1, wherein the sensor is an antenna array.

8. The system of claim 7, wherein the antenna array is comprised of a plurality of phased antennas.

9. The system of claim 8 further comprising a sensor controller to generate a plurality of signals, wherein each of the plurality of signals is associated with at least one of the plurality of phased antennas.

10. The system of claim 7, wherein the antenna array is configured to transmit radar pulses and receive radar returns.

11. A method comprising:
    providing a first channel of one or more channels, wherein the first channel comprises a first DDR memory, a first FIFO, and a first FFT, and wherein the first FIFO and the first FFT are on an FPGA;
    receiving, at the first DDR memory, a burst of return data from at least one sensor;
    storing, at the first DDR memory, the burst of return data in a plurality of first DDR memory cells;
    reading out, at the first DDR memory, sample data from the plurality of first DDR memory cells;
    transmitting the sample data from the first DDR memory to the first FIFO;
    receiving, at the first FIFO, the sample data from the first DDR memory;
    storing, at the first FIFO, the sample data in a plurality of first FIFO memory cells;
    reading out, at the FIFO, the sample data stored in the plurality of first FIFO memory cells in an order the sample data was stored;
    transmitting the read out sample data from the first FIFO to the first FFT;
    and generating, by the first FFT of the first channel, frequency data based on the sample data transmitted from the first FIFO.

12. The method of claim 11, wherein storing, at the first DDR memory, the burst of return data in the DDR memory cells comprises storing the burst of return data in a plurality of rows, and wherein reading out, at the first DDR memory, sample data from the plurality of first DDR memory cells comprises reading out sample data from columns of the plurality of first DDR memory cells.

13. The method of claim 11, wherein the one or more channels include at least three channels; and
wherein the first channel is associated with return data representing azimuth data, a second channel is associated with return data representing elevation data, and a third channel is associated with return data representing sum data.

14. The method of claim 11, wherein the one or more channels includes at least four channels.

15. The method of claim 11 further comprising:
locating a target based at least on the frequency data.

16. The method of claim 15 further comprising: determining a range and a velocity of the target based on the frequency data.

17. The method of claim 11, wherein the sensor is an antenna array.

18. The method of claim 17, wherein the antenna array is comprised of a plurality of phased antennas.

19. The method of claim 18 further comprising:
providing a sensor controller;
generating, by the sensor controller, a plurality of signals, wherein each of the plurality of signals is associated with at least one of the plurality of phased antennas.

20. The method of claim 17 further comprising:
transmitting, with the antenna array, a plurality of radar pulses; and
receiving, with the antenna array, a plurality of radar returns.

* * * * *